June 12, 1923.
C. W. BAUMGARDNER
SEPTIC TANK
Filed April 14, 1922
1,458,796
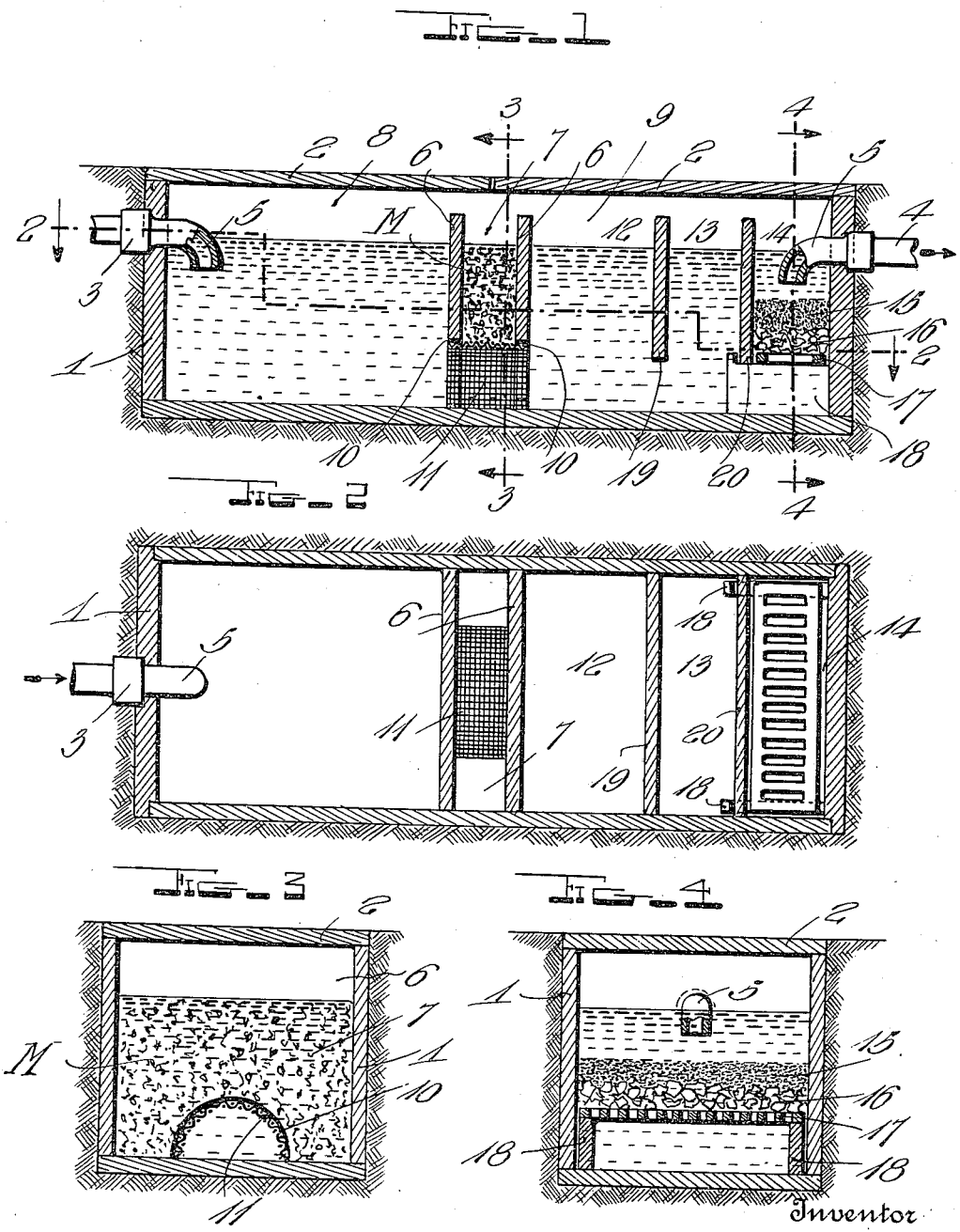
Witness
Inventor
C. W. Baumgardner
By
Attorneys Patented June 12, 1923.

1,458,796

UNITED STATES PATENT OFFICE.

CARL W. BAUMGARDNER, OF TIFFIN, OHIO.

SEPTIC TANK.

Application filed April 14, 1922. Serial No. 552,703.

*To all whom it may concern:*

Be it known that I, CARL W. BAUMGARDNER, a citizen of the United States, residing at Tiffin, in the county of Seneca and State of Ohio, have invented certain new and useful Improvements in a Septic Tank; and I do declare the following to be a full, clear, and exact description of the invention, such as will enable others skilled in the art to which it appertains to make and use the same.

This invention relates to an improved septic tank which is especially designed for use at suburban and country homes, club houses, schools and the like which are not equipped with sanitary sewerage systems such as provided in modern cities.

The principal object of the invention is to generally improve upon devices of this class by providing one which is such in construction that it will entirely consume and automatically dispose of the human excreta in a water-tight, fly-proof, odorless self-cleaning tank into which the bowel discharge is deposited.

Another object of the invention is to provide a tank of this class which embodies an internal pocket designed to be filled with a substance, such as animal manure, for promoting rapid breeding of the bacteria. Hence, there will be a more rapid decomposition of the organic matter than would be the case if no means were provided for rapidly disposing of the human excreta.

A still further object of the invention is to supply a septic tank which has means at its discharge end for clarifying the effluent fluid before it leaves the tank.

A further object of the invention is to devise a septic tank which will safe-guard the occupants of the premises on which the tank is located by thoroughly decomposing and fermenting the organic matter deposited therein.

A more specific object of the invention is to devise a septic tank embodying the aforesaid pocket, the same being constructed from a pair of partitions arranged transversely inside of the tank in spaced parallelism, these partitions having their upper edges spaced from the closure of the tank with their opposite edges engaging the bottom of the tank, the last named edges being formed with restricted openings to retard the passage of the fluid from the collecting compartment into the receiving compartments on the other side of the pocket.

A still further object of the invention is to provide a novel septic tank having a horizontal grate arranged below the discharge or outlet pipe, this grate being spaced above the bottom of the tank and serving to support suitable filtering materials so as to insure that the effluent liquid will be minus all solid matter before it is discharged from the tank.

Other objects and advantages of the invention will be apparent during the course of the following description.

In the accompanying drawings forming a part of this specification and in which like numerals are employed to designate like parts throughout the same:

Figure 1 is a longitudinal vertical section, with parts in elevation, through a septic tank constructed in accordance with this invention.

Figure 2 is a horizontal section taken substantially on the plane of the line 2—2 of Figure 1.

Figures 3 and 4 are transverse vertical sections taken on the lines 3—3 and 4—4 respectively of Figure 1.

In carrying out the invention I employ a substantially rectangular box 1 formed from a plurality of slate or concrete slabs which are secured together to provide a leak-proof container. The open top of this container is closed by two slabs 2. In the drawings the inner ends of these slabs 2 are shown spaced apart, but it is understood that in practice this crack will be closed by suitable means to render the tank air-tight. At the left hand end of the tank there is a conduit 3 which serves to convey and discharge the human excreta and accompanying matter into the tank. It may be conveniently stated here that the tank will be filled with water or other desirable fluid, the normal level of which should be spaced below the closing slabs 2. Proceeding, it will be seen that at the opposite or right-hand end of the tank, there is another conduit designated by the reference character 4 and this is to be known as the discharge conduit. It will be composed of a plurality of lengths of tile properly secured together, the same being embedded in the ground and leading to a suitable point of deposit. The drain or discharge conduit, should in fact, be considerably long so as to permit the desired reactions such as oxidization and nitrification to take place and to insure purification of the liquid by completely destroying any bacteria present in the escaping fluid. Both the discharge and the intake conduits are provided with downturned nipples or pipes 5 which have their free end disposed below the liquid level in the tank.

As before indicated, at the center of the tank are two transverse partitions 6 which are disposed in spaced parallelism to provide what may be conveniently termed, a brooding pocket 7. These partitions also serve to divide the tank into separate compartments 8 and 9, the first named which may be termed the collecting compartment while the other one may be referred to as the receiving compartment. It is to be noted that these partitions 6 rest against the bottom of the tank and are formed with central aligned comparatively large notches 10 which constitute a restricted passage opening up communication between the compartments 8 and 9. The upper edges of the partitions terminate in spaced relation from the closing slabs 2. In practice, a suitable substance, such as for example, animal manure M is designed to be placed in the pocket 7 for the purpose of obtaining the proper bacterial or septic action by promoting a rapid breeding of bacteria or scavenger germs. It is to be noted that the partitions 6 are spaced a considerable distance apart so as to accommodate a goodly amount of breeding material and to permit the liquid in the tank to have access to the latter for thoroughly saturating it. Due to the space existing between these partitions, it is desirable to provide means for preventing the material M from falling down into the liquid in the tank and automatically emptying the pocket. Although any suitable means could be provided, I prefer to simply use an arched wire guard 11 which is extended between and fitted into the aforesaid notches 10.

A careful examination will disclose that the receiving compartment 9 is in itself divided into three chambers or compartments 12, 13 and 14. The first two compartments 12 and 13 function to protect and seclude the young bacteria so as to enable them to thrive and become sufficiently strong to do their part destroying all solid matter existing in the tank. The compartment 14 may be conveniently referred to as a filtering chamber because it serves to accommodate quantities of sand and clinkers 15 and 16 which are arranged in alternate layers on top a horizontal grate 17 supported on plates 18 arranged in the tank. These plates or supports 18 are such as to space the grate a sufficient distance above the bottom of the tank to prevent clogging of the filth at this point. These several compartments 12, 13 and 14 are provided by additional transversed partitions 19 and 20 disposed in parallelism and spaced from one another and from the first named partitions 6. These partitions 19 and 20 have their lower edges spaced above the bottom of the tank and their opposite upper edges spaced below the top thereof so as to permit the liquid in the tank to pass beneath them or over them if circumstances should require it.

In practice, the tank is embedded below the surface of the ground. The fecal matter and liquid will enter the tank 1 through the intake conduit 3 and will be discharged below the water line in the collecting compartment 8. Most of the solid matter will rise to and float on the surface of the liquid in this compartment. Assuming that the tank is inhabited with a multitude of bacteria or scavenger germs, it will be seen that these will invade the collecting compartment and will destroy the solid matter and deadly germs. While this bacterial action is taking place, a multiplicity of bugs or germs will breed in the aforesaid brooding pockets and will thrive in the compartments 12 and 13 and these will in time augment the working bacteria in the collecting compartment and in this way the solid matter in the latter will be reduced to a liquid state in a very short period. As before stated, the young bacteria will be housed in compartments 12 and 13 until they become useful and they will readily thrive in these compartments because they will be undisturbed. The retarded flow of the sewage through the several compartments will provide sufficient time to obtain the proper septic or bacterial action. When the contents of the tank has been liquefied sufficiently, it will pass through the filtering materials and compartments in which these are arranged and will escape through the drain conduit 4. From this conduit it will be conveyed to a suitable point of discharge at some distant point on the premises.

Although I have shown and described a single tank, it is understood that where circumstances require, any number of these tanks will be used, as the invention is not only useful for single suburban homes, but may be successfully employed on grounds where hotels, churches, schools and the like are erected.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A septic tank provided intermediate its ends with a pair of transverse partitions in close spaced parallelism to provide a pocket adapted to receive bacteria breeding material, the lower portions of said partitions extending to and contacting with the bottom of the tank and being formed in their lower ends with oppositely disposed relatively small notches forming a passage from one compartment to another, and an arched wire mesh guard extending transversely through said notches to span the space between the partitions to hold the breeding material in the pocket and permitting the liquid to rise between the partitions to thoroughly saturate the breeding material.

2. A septic tank embodying a pocket adapted to be filled with bacteria breeding material, said pocket being open at its top and bottom, and a reticular member extending across the open bottom to hold said material therein and to permit the entrance of the surrounding fluid to thoroughly saturate the material.

In testimony whereof I have hereunto set my hand.

CARL W. BAUMGARDNER.